United States Patent Office 3,069,230
Patented Dec. 18, 1962

3,069,230
PROCESS FOR EXTRACTING TARTARIC ACID AND POTASSIUM IN FORM OF PURE POTASSIUM NITRATE IN THE COLD FORM TARTARIC RAW MATERIALS
Bruno Pescarolo and Valerio Bianchi, Milan, Italy, assignors to Montecatini, Societa Generale per l'Industria Mineraria e Chimica, Milan, Italy, a corporation of Italy
No Drawing. Filed Feb. 14, 1958, Ser. No. 715,202
Claims priority, application Italy Feb. 19, 1957
9 Claims. (Cl. 23—102)

This invention relates to a process of extracting tartaric acid and potassium as pure potassium nitrate in the cold preferably from low grade tartaric raw materials, either alone or in admixture with high grade tartaric materials, without subjecting them to a previous roasting.

According to prior processes, tartaric materials are generally roasted and then dissolved in warm hydrochloric acid. From the hydrochloric acid solutions calcium tartrate is precipitated while potassium, forming part of the raw material (cream of tartar), remains in the mother liquor in the form of a chloride which is not utilizable.

It has also been proposed to recover the potassium of cream of tartar as a nitrate, either by means of dissolving roasted tartaric raw materials in warm nitric acid or by treating them with calcium nitrate and calcium carbonate (neutral method), but both processes present various shortcomings.

Dissolving the raw material, such as wine dregs, in warm nitric acid is not only inefficient because of the limited solubility of the material, but also does not eliminate the requirement of thermal energy in the previous roasting. The neutral method is not suitable for all raw materials and can be employed only for high grade materials which are low in organic contaminations.

We have now discovered, and this is the principal object of the present invention, that tartaric acid can be recovered in the cold from the raw materials and that potassium in form of pure potassium nitrate can be obtained as a by-product.

It is another object of the present invention to eliminate the roasting step and thereby the expenditure of thermal energy in the recovery of tartaric acid.

It is still another object of the invention to recover potassium in form of pure potassium nitrate when producing tartaric acid.

These and other objects and advantages will appear more clearly from the herein-following detailed description and the appended claims.

Although roasting improves the filterability of the tartaric raw materials, it also causes dissolution of a portion of the organic impurities present, which results in deeply colored solutions from which it is difficult to obtain pure tartaric acid at high yields by crystallization.

If the raw materials are dissolved in the cold, solutions are obtained that can be readily decolorized.

Another advantage of the herein-claimed process is that it is applicable to all types of mixtures of raw materials, as they become available.

Tartaric raw materials which originate from wine manufacture can approximately be divided into low grade materials (dregs and slimes) containing from about 15 to about 25% tartaric acid and high grade materials containing from about 40 to about 70% tartaric acid, the ratio between potassium bitartrate and calcium tartrate varying according to the characteristics of the raw materials.

Further advantages consist in the conversion of all of the potassium present in the raw materials into potassium nitrate with a very high degree of purity, and in avoiding losses of tartaric acid due to roasting.

According to the process of the present invention, the tartaric raw material, either dregs or mixtures of dregs and high grade material (tartars, potassium bitartrate, etc.), are directly dissolved in a cold mixture of nitric and sulfuric acid.

When low grade raw material is being treated, the process comprises treating with sulfuric acid, added in an amount stoichiometrically equivalent to the calcium present in the raw material, and with an amount of nitric acid stoichiometrically equivalent to the potassium present, plus an excess of this last-named acid which assures the dissolution of tartaric acid and which is utilized in a subsequent precipitation stage in order to bind potassium contained in high grade material which is introduced.

If the starting material consists of a mixture of dregs and high grade material, the process is as follows:

Nitric acid is employed in an amount stoichiometrically equivalent to the potassium contained in the starting material, while sulfuric acid is used in excess over the calcium tartrate also present. Such an excess represents the excess of acid required to complete the dissolution of tartaric acid.

The treatment is preferably carried out in a double-bottom vessel, which is particularly useful for extracting ground, low grade materials at high yields.

The tartaric raw materials are stratified within the double-bottom vessel and covered with the acid solution which percolates down through the different layers and is recirculated to the top layer by means of a pump.

In order to improve the circulation rate of the acid solution, the tartaric materials are preferably stratified with the vessel with the coarsest material at the bottom and the finest material at the top.

The particle size of the tartaric materials varies according to the characteristics of the raw materials and to the mechanical means employed for grinding. In the practice particles having a diameter of from about 0.5 to about 4 cm. are suitably used.

The time of percolation depends upon the particle size of the material to be treated and upon the height of the layers. However we have found that the average time of percolation of the acid mixture during a cycle should amount to 2–4 hours.

The charge and discharge of the vessel can be suitably mechanized so that these operations become more rapid and economical. However, the treatment can be also carried out in columns through which the acid solution is percolated and then recycled. As against the double-bottom vessel, these columns have the advantage of smaller diameter and of facilitating the operations of charging and discharging.

In order to attain a high rate of percolation, the raw materials should be of suitable particle size and must not be ground to excessively small size.

The acid solutions are discharged after saturation and passed to the usual precipitation of calcium tartrate, say, by means of lime and separation thereof from the mother liquor which is purified and concentrated in order to crystallize potassium nitrate therefrom.

Calcium tartrate is subsequently treated as usual, say, with sulfuric acid, in order to obtain tartaric acid.

The reaction scheme involved is:

$$C_4O_6H_2KH + HNO_3 \rightarrow C_4O_6H_4 + KNO_3$$
$$C_4O_6H_2Ca + H_2SO_4 \rightarrow CaSO_4 + C_4O_6H_4$$
$$2C_4O_6H_4 + CaCO_3 \rightarrow 2C_4O_6H_2Ca + CO_2 + H_2O$$

The following example is furnished to illustrate, but in no way to limit, the present invention. The example relates to the treatment of low grade tartaric materials with $HNO_3$ and $H_2SO_4$, $HNO_3$ being used in excess to assure complete extraction of tartaric acid and, therefore, complete recovery of $KNO_3$, and to the treatment of added high grade tartaric materials by taking advantage of the excessive nitric acid which has been added.

*Example 1*

Tartaric materials employed:

Low grade materials containing—100 kg. tartaric acid (80 kg. in form of potassium bitartrate and 20 kg. in form of calcium tartrate)

High grade materials—76.7 kg. tartaric acid (69 kg. in form of potassium bitartrate and 7.7 kg. in form of calcium tartrate)

$H_2SO_4$; in an amount equivalent to the calcium tartrate contained in the low grade materials—13.1 kg. (100% $H_2SO_4$)

$HNO_3$; in an amount equivalent to the bitartrate contained in the entire material—64.1 kg. (100% $HNO_3$)

To the acid mixture an amount of water is added in order to have the following concentrations of the acids—$HNO_3$ 90 g./liter; $H_2SO_4$ 18.5 g./liter.

$CaCO_3$; used for precipitating calcium tartrate—109 kg. (100% $CaCO_3$)

Upon dissolving the low grade materials, 710 liters of a solution containing 95 kg. tartaric acid, 51.3 kg. potassium nitrate and 29 kg. free nitric acid are obtained.

To this solution, after heating to 70–80° C., the high grade tartaric material and calcium carbonate are added, thus causing precipitation of calcium tartrate which, after filtration and washing, is decomposed in the aforestated manner.

This calcium tartrate contains 168 kg. tartaric acid.

The mother liquor and the first washings of the calcium tartrate amount to 600 liters and contain 88 kg. potassium nitrate.

This solution is purified and concentrated and, upon crystallization, produces 84 kg. pure potassium nitrate.

The yield of tartaric acid is therefore 95% while that of potassium nitrate is 84%, based on the amount of potassium in the starting material.

*Example 2*

The same low grade materials as in the Example 1 are employed:

Low grade materials containing—100 kg. tartaric acid (80 kg. in form of potassium bitartrate and 20 kg. in form of calcium tartrate)

$H_2SO_4$; in a stoichiometric amount relating to calcium tartrate plus an amount in excess equivalent to 70% of that relating to potassium bitartrate in order to keep in solution the whole potassium bitartrate—39.2 kg. 100% $H_2SO_4$)

$HNO_3$; in an amount equivalent to the bitartrate—33.6 kg. (100% $HNO_3$)

To the acid mixture such an amount of water is added so as to have the following acid concentrations—$HNO_3$ 48.5 g./liter; $H_2SO_4$ 57 g./liter $CaCO_3$; used for precipitating calcium tartrate—87.5 kg. (100% $CaCO_3$)

Upon dissolving the low grade materials 695 liters of a solution containing 95 kg. tartaric acid, 51.5 kg. potassium nitrate and 24.8 kg. free sulphuric acid are obtained.

This solution after having been heated to about 80° C. is neutralized with calcium carbonate and calcium tartrate is precipitated, filtered and washed as usual.

This calcium tartrate contains 92.5 kg. tartaric acid. The mother liquor and the washings of the calcium tartrate amount to 580 liters and contain 48.7 kg. potassium nitrate.

This solution is purified and concentrated and upon crystallization, produces 45.5 kg. pure potassium nitrate.

According to Example 2 also high grade materials only can be treated; in this case more concentrated potassium nitrate solutions are obtained.

By reacting low grade material as illustrated in Example 2, no excess of nitric acid, but an excess of sulphuric acid must be employed, which will be precipitated as $CaSO_4.2H_2O$ together with calcium tartrate during neutralization of the acid mixture with calcium carbonate.

According to what is hereinbefore described, the treatment by percolation in a double-bottom vessel or in a column assures excellent extraction yields and eliminates the necessity of filtering the solutions. Moreover, the invention permits operation in the cold with the raw materials as they are, without any previous roasting; all available raw materials can be used and practically all potassium can be recovered as very pure potassium nitrate.

Elimination of the roasting process prevents the loss of any tartaric acid and the resulting solutions can be readily decolorized:

We claim:

1. A process for extracting tartaric acid and potassium in the form of potassium nitrate from tartaric materials, which comprises treating low grade tartaric material, containing potassium bitartrate and calcium tartrate, having a tartaric content of about 15 to 25% calculated as tartaric acid, with a mixture of nitric acid, at least in stoichiometric amount referred to the potassium present in the total tartaric materials, and sulfuric acid in stoichiometric amount as regards the calcium present therein, employing therein an excess of nitric acid to assure complete extraction of tartaric acid and complete recovery of potassium nitrate, said treatment being at about room temperature, adding to the solution obtained by said treatment a high grade tartaric material, containing potassium bitartrate and calcium tartrate, having a tartaric content of about 40 to about 70% calculated as tartaric acid, heating to a temperature between about 60 and 80° C., the tartaric materials being used without previous roasting.

2. A process for receiving tartaric acid as calcium tartrate and potassium in form of pure potassium nitrate from low grade tartaric materials, containing potassium bitartrate and calcium tartrate, having a tartaric content of about 15 to 25% calculated as tartaric acid, which comprises treating such low grade tartaric materials with a mixture of stoichiometric amount of nitric acid, as regards potassium bitartrate, and sulfuric acid in excess of that stoichiometrically required for reaction with the calcium tartrate present, the sulfuric acid being sufficient for maintaining in solution the whole potassium bitartrate, said treatment being at about room temperature, heating the solution to a temperature of about 60 to 80° C., neutralizing said solution with a substance taken from the group consisting of calcium carbonate and lime, thus obtaining calcium tartrate as a precipitate, filtering and washing said precipitate and concentrating the resulting mother liquor to crystallize pure potassium nitrate, the tartaric materials being used without previous roasting.

3. A process for receiving tartaric acid as calcium tartrate and potassium in form of pure potassium nitrate from high grade tartaric materials, which comprises treating high grade tartaric materials, containing potassium bitartrate and calcium tartrate, having a tartaric content of about 40 to 70% calculated as tartaric acid, with a stoichiometric amount of nitric acid referring to potassium bitartrate and an excess of sulfuric acid for maintaining in solution the whole potassium bitartrate, said treatment being substantially without application of heat, heating the solution to a temperature of about 60 to 80° C., neutralizing said solution with a substance taken from the group consisting of calcium carbonate and lime, thus obtaining calcium tartrate as a precipitate, filtering and washing said precipitate as usual and concentrating the resulting mother liquor to crystallize pure potassium nitrate, the tartaric materials being used without previous roasting.

4. A process comprising dissolving a mixture of low grade tartaric materials, containing potassium bitartrate and calcium tartrate, having a tartaric content of about 15 to about 25% calculated as tartaric acid, and high grade tartaric materials, containing potassium bitartrate and calcium tartrate, having a tartaric content of about 40 to 70% calculated as tartaric acid, in aqueous nitric and sulfuric acid, the sulfuric acid being employed in an amount equivalent to the calcium tartrate contained in the low grade materials, the nitric acid being used in an amount equivalent to the bitartrate contained in the entire tartaric materials, precipitating calcium tartrate from the acid solution with an agent taken from the group consisting of lime and calcium carbonate, and recovering potassium nitrate from the remaining solution.

5. A process comprising subjecting a material containing potassium bitartrate and calcium tartrate to extraction with a mixture of aqueous sulfuric and nitric acids, the sulfuric acid being employed in an at least stoichiometric amount in respect to the calcium tartrate, the nitric acid being employed in at least stoichiometric amount with respect to the bitartrate in said material, whereby an aqueous solution is obtained containing potassium nitrate and tartaric acid.

6. A process comprising treating a material containing potassium bitartrate and calcium tartrate with aqueous sulfuric and nitric acids, the sulfuric acid being employed in an at least stoichiometric amount in respect to the calcium tartrate, the nitric acid being employed in at least stoichiometric amount with respect to the bitartrate in said material, whereby an aqueous solution is obtained containing potassium nitrate and tartaric acid, precipitating calcium tartrate from the solution with a member of the group consisting of lime and calcium carbonate, and recovering potassium nitrate from the remaining solution.

7. The process of claim 5 applied to low grade tartaric materials comprising substances taken from the group consisting of wine dregs and slimes, containing about 15 to 25% tartaric acid, the sulfuric acid employed being stoichiometrically equivalent to the calcium present in the material, the nitric acid being employed in excess of said stoichiometric amount, to assure dissolution of tartaric acid.

8. A process comprising extracting a material containing potassium bitartrate and calcium tartrate with a mixture of aqueous sulfuric and nitric acids, the sulfuric acid being employed in an at least stoichiometric amount in respect to the calcium tartrate, the nitric acid being employed in at least stoichiometric amount with respect to the bitartrate in said material, whereby an aqueous solution is obtained containing potassium nitrate and free tartaric acid, said extraction being carried out at room temperature, the acid solution percolating downwardly through the said material and being recirculated through said material.

9. A process comprising extracting a material containing potassium bitartrate and calcium tartrate with a mixture of aqueous sulfuric and nitric acids, the sulfuric acid being employed in an at least stoichiometric amount in respect to the calcium tartrate, the nitric acid being employed in at least stoichiometric amount with respect to the bitartrate in said material, whereby an aqueous solution is obtained containing potassium nitrate and free tartaric acid, the acid solution percolating downwardly through the said material and being recirculated through said material.

References Cited in the file of this patent

UNITED STATES PATENTS

| 1,060,869 | Vigneaux | May 6, 1913 |
| 1,278,257 | Tobler | Sept. 10, 1918 |
| 2,456,752 | Surmatis | Dec. 21, 1948 |
| 2,710,789 | Boeri | June 14, 1955 |

FOREIGN PATENTS

| 490,221 | Italy | Feb. 6, 1954 |